(12) United States Patent
Arnaud

(10) Patent No.: US 6,811,709 B2
(45) Date of Patent: Nov. 2, 2004

(54) METHOD AND APPARATUS FOR MIXING FLUIDS, SEPARATING FLUIDS, AND SEPARATING SOLIDS FROM FLUIDS

(75) Inventor: Johnny Arnaud, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 0 days.

(21) Appl. No.: 10/716,380

(22) Filed: Nov. 18, 2003

(65) Prior Publication Data

US 2004/0140273 A1 Jul. 22, 2004

Related U.S. Application Data

(62) Division of application No. 09/879,496, filed on Jun. 12, 2001, now Pat. No. 6,669,843.

(51) Int. Cl.[7] ............................. B01D 21/26; B01F 3/04
(52) U.S. Cl. ..................... 210/750; 210/787; 210/788; 55/345; 55/459.1; 95/261; 261/53; 261/77; 366/165.1; 366/173.2; 366/177.1; 366/101
(58) Field of Search ................................ 210/188, 218, 210/750, 220, 221.2, 512.1, 787, 788; 55/345, 459.1; 95/261, 208, 209, 351, 352; 261/53, 77; 366/101, 165.5, 173.2, 177.1

(56) References Cited

U.S. PATENT DOCUMENTS

| | | | |
|---|---|---|---|
| 2,735,547 A | 2/1956 | Vissac | |
| 3,289,608 A | 12/1966 | Laval, Jr. | |
| 3,447,511 A | 6/1969 | Beard et al. | ............ 123/3 |
| 3,507,397 A | 4/1970 | Robinson | |
| 3,512,651 A | 5/1970 | Laval, Jr. | |
| 3,568,837 A | 3/1971 | Laval, Jr. | ............ 210/136 |
| 3,947,364 A | 3/1976 | Laval, Jr. | |
| 4,237,006 A | 12/1980 | Colman et al. | |
| 4,374,030 A * | 2/1983 | Franklin, Jr. | ............ 210/221.2 |
| 4,790,942 A | 12/1988 | Shmidt et al. | ............ 210/650 |
| 5,000,848 A | 3/1991 | Hodgins et al. | ............ 210/321.68 |
| 5,021,165 A | 6/1991 | Kalnins | ............ 210/703 |
| 5,071,542 A | 12/1991 | Tuszko et al. | |
| 5,131,757 A | 7/1992 | Smith | |
| 5,362,395 A | 11/1994 | Dorau et al. | ............ 210/638 |
| 5,451,349 A | 9/1995 | Kingsley | ............ 261/91 |
| 5,478,484 A | 12/1995 | Michaluk | ............ 210/788 |
| 5,647,977 A | 7/1997 | Arnaud | ............ 210/167 |
| 5,794,791 A | 8/1998 | Kindig | ............ 209/727 |
| 5,882,530 A | 3/1999 | Chase | ............ 210/788 |

(List continued on next page.)

OTHER PUBLICATIONS

"Fundamentals of *General Chemistry*", C. H. Sorum, University of Wisconsin (undated).

(List continued on next page.)

*Primary Examiner*—David A. Reifsnyder
(74) *Attorney, Agent, or Firm*—Howrey Simon Arnold & White, LLP

(57) ABSTRACT

An apparatus is provided for separation of suspended solid particles from fluids, for separation and mixing of fluids, and for dissolving gases in aqueous fluids. The apparatus employs a grooved ring to divide the fluid stream and impart a high velocity on each of the divided or sub-streams. A grooved ring with any number of grooves that may be spiral in shape is used to create a high velocity circular motion on a divided stream for separation of suspended solid particles by centrifugal force in a cyclone filter and for saturation of liquid with gases in a fluid mixer where gases are introduced through a diffuser. A grooved ring with any number of grooves that may be radial is used in a fluid mixer to divide a stream of fluid, produce a high velocity flow through each groove, introduce a second fluid through an orifice into the first fluid flowing through each groove, and direct the fluid mixture to a center impact zone where the various streams collide to complete the mixing.

12 Claims, 13 Drawing Sheets

U.S. PATENT DOCUMENTS

| | | | |
|---|---|---|---|
| 5,944,998 A | 8/1999 | Rolchigo et al. | 210/654 |
| 6,024,874 A | 2/2000 | Lott | 210/512.1 |
| 6,032,931 A | 3/2000 | Plunkett | 261/77 |
| 6,080,317 A | 6/2000 | Wagner et al. | 210/652 |
| 6,106,713 A | 8/2000 | Miller et al. | 210/321.63 |
| 6,165,365 A | 12/2000 | Salyer et al. | 210/650 |
| 6,168,724 B1 | 1/2001 | Hurwitz | 210/780 |
| 2003/0168211 A1 | 9/2003 | Arnaud et al. | 166/68 |
| 2003/0173275 A1 | 9/2003 | Arnaud | 210/143 |
| 2003/0173276 A1 | 9/2003 | Arnaud | 210/143 |
| 2003/0173288 A1 | 9/2003 | Arnaud | 210/512.1 |
| 2004/0031472 A1 | 2/2004 | Arnaud | 210/259 |

OTHER PUBLICATIONS

"Chemical Calculations An Introduction to the Use of Mathematics in Chemistry", Sidney W. Benson, University of Southern California (undated).

"Fluid Mechanics With Engineering Applications", R. L. Daugherty, California Institute of Technology, 1954.

"Equipment and Applications For Industry", Claude Laval Corporation (undated).

"Industrial Process Problem Solving . . . Solids/Liquids and Liquid/Liquid Hydrocyclones for Separation, Classification, and Dewatering", © 1995 Krebs Engineers.

Demco Cyclone Separators Catalog CI–78, Aug. 15, 1978.

Geosource® The Pioneer in solids/liquid separation, 1979 Catalog.

Hydrocyclones Problem Solving in Liquid/Solids Separation, Picenso International Inc. (undated).

"Facts about liquid cyclones. Where to use them. Where not to use them. And how to specify the right cyclone for the job. With special emphasis on The Dorrclone®"; ©1979 Dorr–Oliver Incorporated.

"Porous Plastics" Porex®, © 1998 Porex Technologies Corp.

"Nitroxy Siliporite® Molecular Sieves for Medical Oxygen Concentrations" CESA, (no date).

"New Trends In Air Separation Adsorbents" by Marie–Theres Grandmougin, et al.; CECA, France (undated).

"Clarifying Oilfield and Refinery Waste Waters by Flotation," Journal of Petroleum Technology, pp. 426–430, dated Apr. 1973.

"Membrane Bioreactors for Wastewater Treatment;" by Tom Stephenson, et al.; dated 2000, reprinted 2001.

"New Developments in High Shear Crossflow Membrane Filtration;" Fluid/Particle Separation Journal, pp. 123–138, vol. 4, No. 1, Mar. 1991.

"The Application of Demulsification Chemicals in Recycling, Recovery and Disposal of Oily Waters;" Sam Delchad, Ph. D., Emulsions Control Inc. California (no date).

EPA Technical Bulletin, EPA 456/F–99–006R; "Nitrogen Oxides (NOx), Why and How They Are Controlled;" Nov. 1999.

"Superior Nitrate Removal for Treatment Plants and the Home;" Sybron Chemicals Inc.; Ionic® SR–7 Advanced Anion Exchange Resin. (undated).

Solicitation for Financial Assistance Applications No. DE–PS26–02NT41613; "Development of Technologies and Capabilities for Developing Coal, Oil and Gas Energy Resources;" p. 55, "3. Gas Flooding". (undated).

International Search Report; International application No. PCT/US02/39623; mailed Mar. 27, 2003.

* cited by examiner

METHOD AND APPARATUS FOR MIXING FLUIDS, SEPARATING FLUIDS, AND SEPARATING SOLIDS FROM FLUIDS

CROSS-REFERENCE TO RELATED APPLICATIONS

This application is a divisional application of application Ser. No. 09/879,496, originally entitled Method and Apparatus for Mixing Fluids, Separating Fluids, and Separating solids from Fluids" which is hereby incorporated by reference herein in its entirety, now U.S. Pat. No. 6,669,843, issued Dec. 30, 2003, entitled Apparatus for Mixing Fluids" by Johnny Arnaud, also incorporated by reference herein in its entirety.

BACKGROUND OF THE INVENTION

1. Field of the Invention

The invention relates to methods and apparatus of physical separation of solids from fluids or for mixing two fluids. More specifically, the invention relates to methods and apparatus for separating solids from fluids and mixing fluids by using a ring having a plurality of grooves through which fluid passes. The methods and apparatus of the present invention are particularly suitable for use in treatment of aqueous fluids, such as water and wastewater, by dynamic separation of contaminants to be removed and by dynamic mixing of treating agents to be added as part of treatment.

2. Description of the Related Art

Commercial and industrial processes currently employ countless operations involving mixing of fluids (liquids with liquids, gases with liquids, and gases with gases) or separation of fluids or solids from other fluids For example, excessive contaminants must be removed from the wastewater of food service institutions (restaurants, cafeterias, hospitals, etc.) before the water may be discharged. If established discharge-contamination levels are exceeded, cities and other governmental authorities may impose surcharges on the food service institutions. These surcharges increase the costs of doing business.

Typically, food service establishments are required to have grease interceptors, commonly called "grease traps", installed in wastewater outlets with sampling wells downstream of the grease traps before the discharge enters the public sewage lines so the authorities can check the discharge from each facility. When the grease traps become full, the contaminants collected in them are removed by vacuum trucks and further treated before discharging to the public sewage.

In addition to the problem of discharging excessive contaminants to public sewage systems, animal fat rendered during the cooking process can congeal when mixed with cold water and clog up the drain lines from the kitchens to the grease traps. When this occurs, the businesses may be shutdown and typically require routing out with a rotor cutter driven by a mechanical cable to open the lines.

Some of the contaminants are destroyed in the grease traps by bacteria. When the contaminants exceed the capacity of what the bacteria can consume, they must be removed from the grease traps by vacuum trucks, or they are discharged to the public sewer, which can result in surcharges as mentioned above.

Bacteria are active only at the limited outer surface of the contaminants to be consumed as food. The bacteria produce enzymes to disperse the contaminants and increase the amount of surface, and the amount of food, available to them. A different enzyme may be required to disperse each contaminant present. When the food is available, bacteria can reproduce in large quantities in very short periods of time. Oxygen dissolved in the water drained into grease traps can become quickly depleted, and aerobic bacteria (those requiring oxygen continuously in order to survive) die. This leaves the task of consuming the contaminants to the anaerobic bacteria (those requiring the absence of oxygen in order to survive). Anaerobic bacteria are not as efficient as aerobic bacteria in consuming the contaminants, and they also produce offensive odors in the process of consuming their food. The offensive odors are prevalent around businesses with grease traps.

Feeding aerobic bacteria in the drain lines from the kitchens has been somewhat successful at either keeping the lines from clogging or increasing the intervals between the times mechanical routing is required. As soon as the aerobic bacteria reaches the grease trap with the oxygen depleted, they die.

Attempts have been made to keep the bacteria alive by bubbling air in grease traps with limited success. Bubbling air even with the finest diffusers creates a large amount of foam in the grease traps. Therefore, air injection has been largely limited to short periods of time and to smaller systems.

Air bubbles rise quickly out of the water, and the bottom of the grease traps return to an anaerobic condition almost immediately preventing the efficient aerobic bacteria from consuming the solids on the bottom of the grease trap. This limits the bubbling of air to the upper part of the grease trap. When oxygen reaches the anaerobic bacteria on the bottom of the grease trap, they die. Therefore, a periodic kill of the anaerobic bacteria on the solids settled on the bottom of the grease trap can be expected. When left for an extended period of time, the solids on the bottom of the grease trap can become packed and act as a seal to prevent oxygen from penetrating into the solids. Only floating contaminants are then consumed by the aerobic bacteria. The offensive odors are also not eliminated.

Therefore, in the food service industry, there is a need for an efficient apparatus and method that can effectively remove particles from wastewater without the problems mentioned above, e.g. incurring surcharges for unsuccessfully meeting contaminant levels, producing offensive odors, requiring the introduction of bubbling air, thus increasing costs, etc.

Another industry faced with the problem of removing contaminants from fluids is the vehicle washing industry. Water used for vehicle washing typically contains significant amounts of suspended solids, dissolved minerals, and organic materials, including oils and other hydrocarbons. Detergents and other chemicals used in the wash operation present further difficulties to the discharge problems. The wash water with the contaminants is typically drained into some type of still pool as a pit or sump. Some of the still pools function as settling basins for the suspended solids and as oil interceptors similar to the grease traps used in food processing facilities.

The water is typically reused in the washing part of the wash cycle until it becomes apparent that the quality of the vehicle wash is no longer satisfactory. Vacuum trucks are then used to remove the contaminants from the sumps and haul them away to disposal sites. Still pools are optimal breeding ground for anaerobic bacteria, which give off a strong and unpleasant odor. The offensive odors are often detected by customers, especially early in the morning when the systems have been shutdown for the night. Bubbling large quantities of air in the still pools can reduce the offensive odors.

The bubbling of air continuously can cause a foaming problem in the sumps. In addition to the offensive odors, governmental regulations may limit the amount of contaminants that can be discharged into the public sewer systems and totally prevent discharge to the environments.

Multiple attempts have been made to improve the process of separating particles from fluid. For instance, U.S. Pat. No. 5,647,977 discloses that the water from vehicle wash facilities can be completely recycled, without water discharge. However, where the cost of water is not a factor and the public sewage system can accept certain contaminants, a complete recycling system may not be cost justified. In such systems, aeration by dissolved oxygen can be used to element the foul odors without the foaming problems typically caused by continuously bubbling air in the sumps. Additional treatment to remove the suspended solids and reduce the organic materials in the sump, other than detergents, can render the water suitable for reuse in the washing part of the vehicle wash cycle, or for discharge where permitted in selected public sewage systems.

Another industry faced with the problem of separation of suspended solid particles from fluids is the water treatment industry. Typically, the solid particles are removed by settling in still pools, centrifugal separation by cyclone filters, and adding flocculating accelerators followed by clarification. Secondary filtration of the fluids often follows the bulk removal operations. The solid particles have to be concentrated and dewatered after separation for disposal. These steps may increase the time and money associated with the particle-removal operation.

An industry having the need to aerate water is the livestock industry. Concentrated animal feeding operations including cattle, swine, poultry, sheep, horses, etc. typically have ponds called "lagoons" in which all animal waste is collected. Aeration with dissolved air in water continuously circulating through the lagoons allows naturally occurring bacteria to thrive in the nutrient rich environment of lagoons and greatly accelerate decomposition of the organic waste. Similarly aquatic farms, such as for fish and shrimp, with concentrations of species may require injection of supplementary oxygen in the water to replace oxygen consumed by decaying plants.

To remove contaminants from wastewater, many present applications employ a cyclone filter. A typical cyclone filter is an apparatus that can be used to separate suspended solids from fluids (such as solids from water and air) and to separate fluids of different densities (such as oil and water) by using the centrifugal force caused by a forced spiral vortex. The external force used to generate the spiral vortex in a cyclone filter is typically provided by injecting a stream of a contaminated fluid at high velocity into the filter at one end perpendicular and at a tangent to the cylinder in which the fluid circulation occurs. The axis of circulation in a cyclone filter can be at any angle from vertical to horizontal.

When the axis of circulation is vertical, the direction of the forces of gravity are, therefore, equal around the entire circular path of the fluid. When the axis of circulation is at some angle other than vertical, the design of the cyclone filter has to account for the differences in the direction of the forces of gravity acting on the fluid as it flows while circulating with or against the forces of gravity.

The design of the inlet through which the high velocity fluid is introduced becomes a major factor in the effectiveness of present cyclone filters, especially in the separation of very fine (small) solid particles from fluids.

Present cyclone filters typically have only one inlet through which the fluid and contaminant mixture is introduced. The single inlet may be typically round or rectangular. And in present cyclone filters, the inlet must supply fluid tangentially to the filter. This may lead to difficulties in certain applications.

Several attempts have been made to improve the efficiency and effectiveness of cyclone filters. For instance, U.S. Pat. No. 5,882,530 describes using a cyclone separator in which the lower frustoconical surface contains porous surfaces. The cyclone separator of the '530 patent may be used for separating a suspension. However, it has been found that over time, particles concentrate along the inner walls of the apparatus as a result of centrifugal forces and tend to clump together and adhere to the porous walls. This clump formation or caking impedes the exit of the carrier fluid through the porous walls.

Other attempts include those disclosed in U.S. Pat. Nos. 5,021,165, 5,478,484, and 6,024,874. However, these attempts generally require the incoming fluid to be tangentially fed into cyclone filter. This limits the use of the filters when tangential feeding is not possible, for example.

Thus, a need exists for an improved apparatus and method of removing particles from fluids. It is desirable that the apparatus and method remove particles at a desired level to reduce the chance of the imposition of a surcharge. It is desirable that the method should not increase costs or increase time involved in removing the particles. An apparatus that does not have to input the fluid tangentially is desired. A need also exists for an improved method of mixing fluids or aerating fluids in a timely fashion.

It will become clear to those skilled in the art having the benefit of this disclosure that the methods and apparatus in accordance with he present invention overcome, or at least minimize, the deficiencies of existing mixing apparatus and methods.

SUMMARY OF THE INVENTION

The present invention provides a new method and apparatus for separation of suspended solids from aqueous fluids, for separation and mixing of fluids, and for dissolving gases in aqueous fluids. An apparatus in accordance with one embodiment of the present invention may employ a grooved ring to divide the fluid stream and impart a high velocity on each of the divided streams. A grooved ring with any number of grooves that may be spiraled may be employed to create a high velocity circular motion on the divided stream for separation of suspended solid particles by centrifugal force in a cyclone filter and for saturation of liquids with gases in a fluid mixer where gases are introduced through a diffuser.

A grooved ring with any number of grooves, that may be radial, is described in another embodiment as fluid mixer to divide a stream of fluid, produce a high velocity flow through each groove, introduce a second fluid through an orifice into the first fluid flowing through each groove, and direct the fluid mixture to a center impact zone where the various streams collide to complete the mixing.

Another embodiment of a cyclone filter of the present invention consists of a spiral-grooved ring inlet, a downflow annulus between a long outer cylinder and a short inner cylinder, a wider solid particle collection chamber below the long cylinder, a fluid interceptor positioned just below the long cylinder in the collection chamber, and a vortex finder and outlet in the inside diameter of the short inner cylinder of the annulus. Fluid contaminated with solid particles may enter the cyclone filter and may be divided to flow through any number of spiral grooves in the spiral-grooved ring then injected at high velocity around the circumference of the down-flow annulus to spiral downward.

The solid particles migrate to the outside of the circulating stream and are separated from the fluid at the bottom of the long cylinder as the flow is reversed by the interceptor to flow upward in the low pressure center of the circulating stream to the vortex finder and out the top of the filter.

Another embodiment of a cyclone filter of the present invention consists of a spiral-grooved ring inlet, a housing having an upper cylinder and a lower cone, a vortex finder and fluid outlet in the top center of the upper cylinder, and a solid particle outlet at the bottom of the cone. The spiral-grooved ring inlet is positioned outside the upper cylinder. Fluid contaminated with solid particles enters the cyclone filter and flows through the grooves in the spiral-grooved ring then injected at high velocity in a number of streams around the circumference and at a tangent to the top inside diameter of the upper cylinder creating a centrifugal force to drive the solid particles against the inside diameter of the upper cylinder and lower cone as it spirals downward. The solid particles continue to flow downward and are separated from the fluid and out the bottom of the cone as the fluid flow is reversed by the decreasing area of the cone to flow upward in the low pressure center of the circulating stream to the vortex finder and out the top of the filter.

Another embodiment of a cyclone filter of the present invention has the same housing with the spiral-grooved ring on the outside as the embodiment described above with a narrow annulus added just inside the upper cylinder with the incoming fluid injected in multiple high velocity streams into the annulus to spiral downward to exit the annulus in the lower part of the cylinder away from the outlet as a narrow high velocity stream against the cylinder wall. The narrow annulus eliminates the need for a vortex finder as part of the outlet in many applications.

Another embodiment of a cyclone filter of the present invention has a grooved ring mounted inside the narrow annulus around the outlet on large cyclone filters with the fluid injected from the inside outward into the annulus.

A fluid mixer is described. In one embodiment the fluid mixer of the present invention is applied as a dissolved gas generator consisting of a cylinder used as the housing, a spiral-grooved ring liquid inlet located on the outside near the top of the cylinder, an inverted cone gas diffuser mounted in the center of the cylinder below the level of the spiral-grooved ring inlet, a gas inlet to the diffuser, an excess gas outlet in the top of the cylinder, and a saturated fluid outlet in the bottom of the cylinder. The liquid enters the fluid mixer and flows through the grooves of the spiral-grooved ring then injected at high velocity in a number of streams around the circumference of the cylinder creating a circular flow above the inverted cone diffuser with a vortex at its center. The circulating liquid flows downward around the inverted cone diffuser and intercepts and dissolves the gas distributed through the diffuser as it flows upward. The liquid saturated with the gas continues to flow downward and out of the fluid mixer through the bottom outlet. The excess gas flows upward past the inverted cone diffuser and is separated from the liquid in the vortex and released to atmosphere from the top of the fluid mixer.

Another embodiment of the fluid mixer of the present invention is also applied as a dissolved gas generator consisting of an upper housing, an orifice ring, a radial-grooved ring, and a lower cylinder with a cap. The upper housing has a liquid inlet, a gas inlet, an excess gas separation zone, and an excess gas outlet. The orifice ring and the radial-grooved ring are mounted inside the upper housing with the orifice ports in the orifice ring positioned over the grooves in the radial-grooved ring. Liquid enters the fluid mixer and flows through the grooves in the radial-grooved ring where gas is injected through the orifice ring into each of the high velocity streams. The liquid-gas mixture stream in each groove is injected into the impact zone to collide with each other. The liquid becomes saturated and flows downward into the lower cylinder where the excess gas forms bubbles and flows upward to return to the impact zone. The saturated liquid exits through the bottom of the fluid mixer. The excess gas flows to the gas separation zone above the impact zone, separated from the liquid, and released to atmosphere.

Another embodiment of the fluid mixer of the present invention is used for mixing liquids, for mixing gases, and for mixing liquids and gases where excess gases do not have to be separated from the liquids. The fluid mixer consists of an upper housing, an orifice ring, a radial-grooved ring, and a short cylinder with a cap. The center of the radial-grooved ring serves as an impact zone to which the streams are directed. The first fluid enters the fluid mixer and flows through the grooves in the grooved ring where a second fluid is injected through the orifice ring into each of the high velocity streams. The fluid mixture in each of the radial grooves is then injected at high velocity into the impact zone to collide with each other and become completely mixed. The fluid mixture flows downward out of the impact zone into the lower cylinder and out the bottom of the fluid mixer.

Another embodiment of the fluid mixer of the present invention is also used for mixing liquids, for mixing gases, and for mixing liquids and gases where excess gases do not have to be separated from the liquids. The fluid mixer consists of an upper housing, a radial-grooved ring, a combination venturi-orifice ring positioned with the venturi and orifice ports in each groove of the radial-groove ring in order to draw by suction a second fluid into each stream, and an impact zone to complete the mixing of various fluids.

BRIEF DESCRIPTION OF THE DRAWINGS

FIG. 4 illustrates the horizontal flow of the fluid as it enters the cyclone filter. FIG. 5 is a fluid flow diagram illustrating the vertical flow of the fluid through the components of the cyclone filter.

FIG. 6 illustrates the horizontal flow of the fluid as it enters the cyclone filter. FIG. 7 is a fluid flow diagram illustrating the vertical flow of the fluid through the components of the cyclone filter.

FIG. 8 illustrates the horizontal flow of the fluid as it enters the cyclone filter. FIG. 9 is a fluid flow diagram illustrating the vertical flow of the fluid through the components of the cyclone filter.

FIG. 10 illustrates the horizontal flow of the fluid as it enters the cyclone filter. FIG. 11 is a fluid flow diagram illustrating the vertical flow of the fluid through the components of the cyclone filter.

FIG. 13 illustrates the horizontal flow of the fluid as it enters the fluid mixer. FIG. 14 is a fluid flow diagram illustrating the vertical flow of the fluids through the components of the fluid mixer.

FIG. 15 illustrates the horizontal flow of the liquid as it enters the fluid mixer and flows through the radial-grooved ring. FIG. 16 illustrates the horizontal flow of the liquid as it enters the fluid mixer and flows through the radial-grooved ring with an orifice ring positioned with the orifice ports over each groove in order to inject a gas into each stream. FIG. 17 is a fluid flow diagram illustrating the vertical flow of the fluids through the components of the fluid mixer.

DESCRIPTION OF ILLUSTRATIVE EMBODIMENTS

The dynamics of fluid flow generally can be mathematically expressed by conservation of energy, momentum, and impulse. When fluid flows in a curved path, pressure is increased (1) with the radial distance from the center of rotation outward, (2) with the angular velocity of the fluid, and (2) with the unit mass of the fluid. A fluid may rotate in a closed vessel by applying an external force resulting in a forced vortex. If the entire body of fluid rotates together with all particles rotating in a concentric circle, a cylindrical vortex is formed. If radial flow is combined with the circular flow, a forced spiral vortex results. The forced spiral vortex can be used for separation of fluids by density, separation of suspended solids from fluids also by density, and the mixing of various fluids.

Illustrative embodiments of the invention are described below as they might be employed in the use of methods and apparatus for separating fluids, mixing fluids, and separating solids from fluids. In the interest of clarity, not all features of an actual implementation are described in this specification. It will of course be appreciated that in the development of any such actual embodiment, numerous implementation-specific decisions must be made to achieve the developers'specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
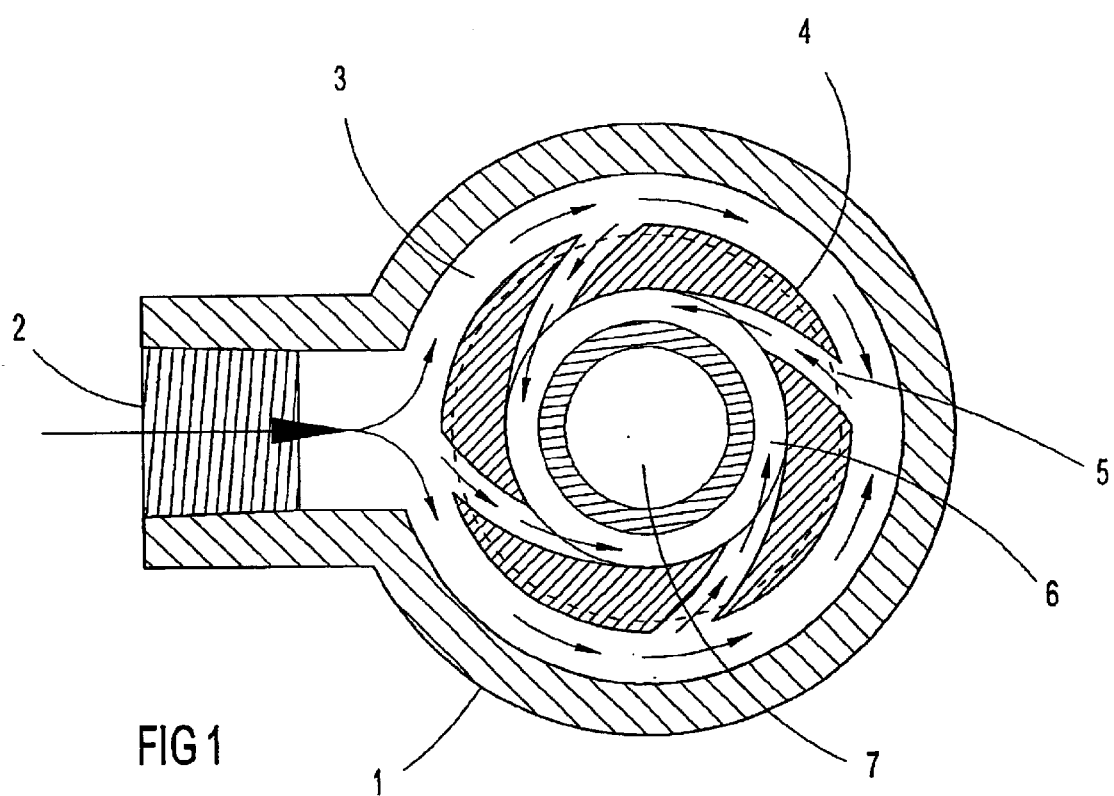
FIG. 1 depicts a schematic representation of a cyclone filter illustrating the fluid flow pattern through a spiral-grooved ring in accordance with the present invention.

Referring now to the drawings in more detail, and particular to FIG. 1, therein is depicted in schematic representation of the inlet of a cyclone filter 1 in accordance with the present invention for separating suspended solids from an aqueous fluid, such as water, by centrifugal force. The cyclone filter 1 consists of an inlet 2, a distribution channel 3, a spiral-grooved ring 4 with multiple grooves 5, a down-flow annulus 6, and an up-flow outlet 7. The arrows indicate the direction of flow.

Fluid, such as water, containing suspended solids flows into the filter system 1 through inlet 2 and flows into a distribution channel 3 around spiral grooved ring 4 then into four spiral grooves 5 where the velocity is increased and injected into the down-flow annulus 6 at a tangent to the circle formed by the outside diameter of the down-flow annulus 6 to flow downward in a spiral motion. The four spiral grooves 5 are illustrated each with the same width as the down-flow annulus 6. The number and depth of the spiral grooves 5 are selected to provide the optimum fluid velocity at the application flowrate. The centrifugal force causes the heaviest materials in the circulating fluid to flow to the outside edges of the annulus 6 as the water spirals downward. It is well understood by those skilled in the art that the higher the velocity of the water in circulation the smaller the particles that can be removed at any given flowrate.

Figure 2:
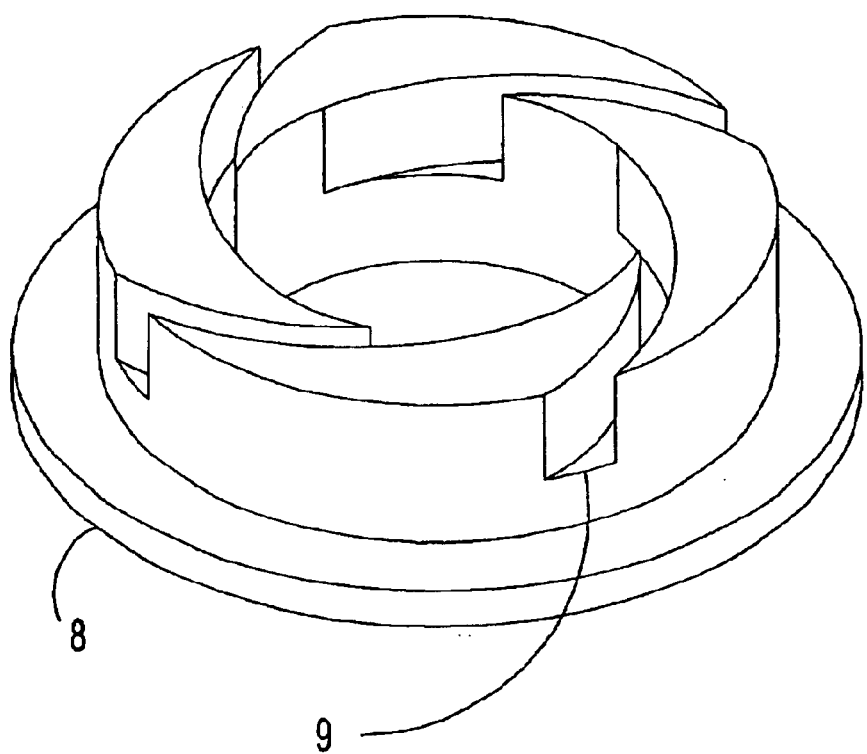
FIG. 2 depicts a three dimensional view of a spiral-grooved ring in accordance with the present invention identifying the depth of the grooves.

In FIG. 2 is depicted a three-dimensional spiral grooved ring 8 having four spiral grooves 9 with a certain depth. The depth and width of the four grooves 9 are selected to provide the optimum water flow velocity to be injected into the down-flow annulus.

Figure 3:
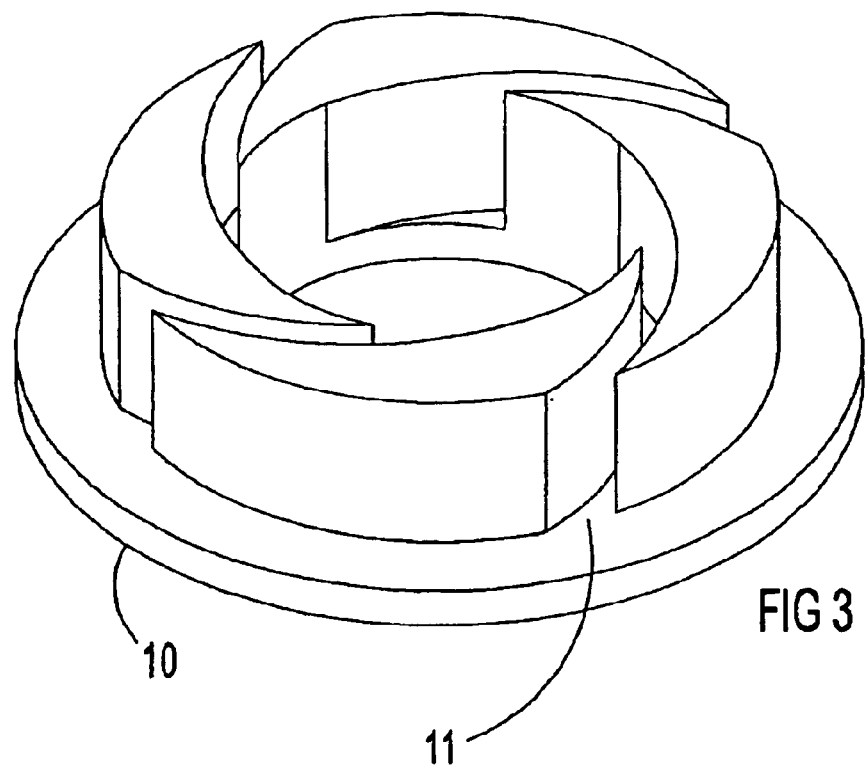
FIG. 3 depicts a second three dimensional view of a spiral-grooved ring in accordance with the present invention illustrating deeper grooves.

FIG. 3 illustrates a second spiral-grooved ring 10 having four grooves 11 that are deeper than those illustrated in FIG. 2. Any desired fluid velocity could be obtained by simply changing the replaceable spiral grooved ring.

Figure 4:
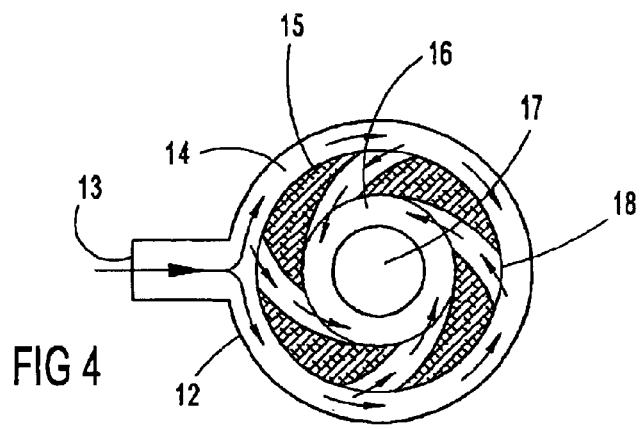
FIGS. 4 and 5 are fluid diagrams of another embodiment of a cyclone filter employing a spiral-grooved ring to divide the entering fluid and inject the fluid in high velocity multiple streams into an annulus in accordance with the present invention.
Figure 5:
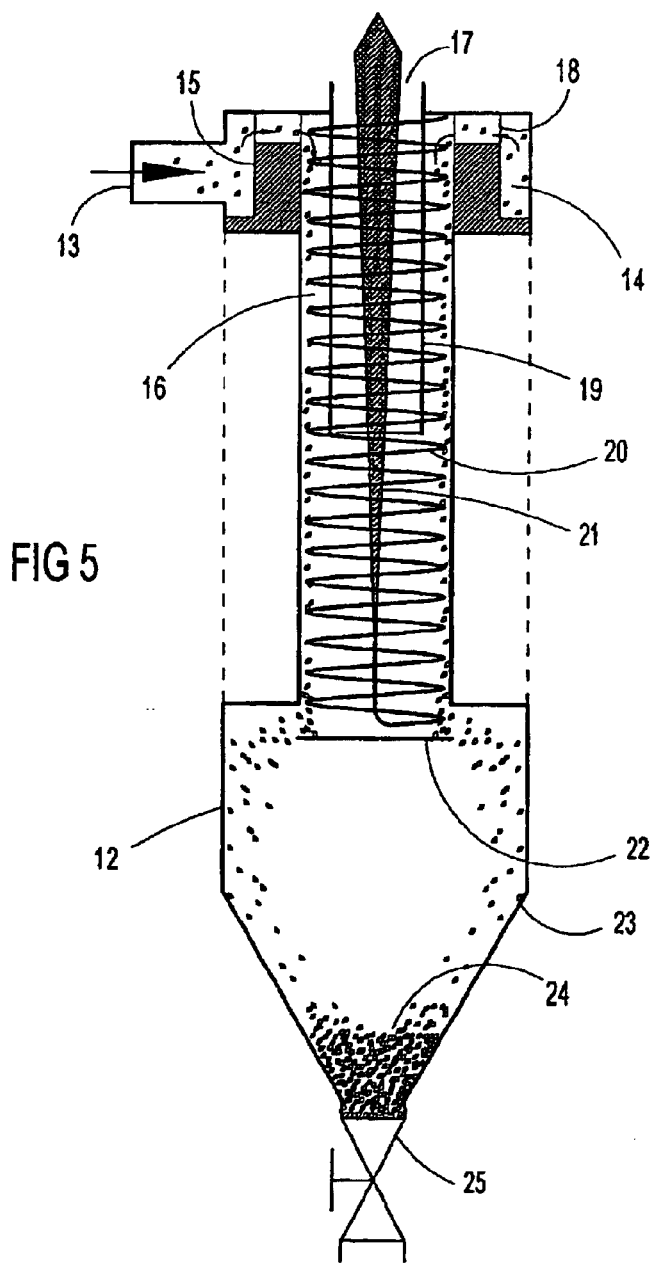

FIGS. 4 and 5 illustrate simplified horizontal and vertical schematics of a cyclone filter in accordance with the present invention. The cyclone filter 12 consists of an inlet 13, a distribution channel 14, a spiral-grooved ring 15 with multiple spiral grooves 18, a down-flow annulus 16, a collection chamber 23 for the separated solids 24, a deflector 22, a vortex finder 19, and an outlet 17.

FIG. 4 illustrates the horizontal flow of water as it enters the cyclone filter 12. The arrows indicate the direction of water flow. Referring to FIG. 4 water containing the suspended particles to be removed enters the filter through the inlet 13 and flows into the distribution channel 14 and flows in both directions around the spiral-grooved ring 15. The water from the distribution channel 14 is then divided and flows into the four grooves 18 where its velocity is increased then injected into the down-flow annulus 16 and flows downward in a spiral motion. The suspended solids are separated from the water in the lower part of the filter, and the water flows upward and out of the filter through the outlet 17.

FIG. 5 illustrates the flow pattern of the water in a vertical schematic of the cyclone filter 12. Again, water containing the suspended solids to be removed enters the filter through inlet 13 and flows into the distribution channel 14 around the spiral-grooved disc 15. The circulating water flows through the spiral grooves 18 and is injected at a high velocity into the down-flow annulus 16 and flows downward in a spiral motion 20. The centrifugal force caused by the circulating water drives the suspended particles the outer diameter of the down-flow annulus 16 and causes a vortex 21 to form in the center. A deflector 22 is located in the lower part of the filter where the diameter is increased. The increase in diameter allows the solid particles to flow outward away from the down-flow annulus while the deflector 22 causes the water to reverse and flow upward in the lower pressure center of the stream and out through the outlet 17. The solid particles 24 accumulate in a collection chamber 23 in the lower part of the filter 12 below the deflector 22 and are periodically removed through the bottom outlet valve 25.

Figure 6:
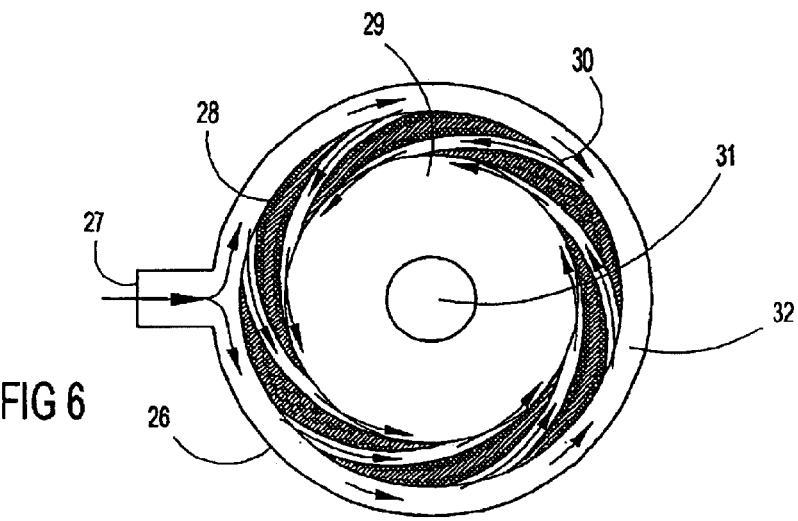
FIGS. 6 and 7 are fluid diagrams of another embodiment of a cyclone filter employing a spiral-grooved ring mounted outside the housing to divide the entering fluid and inject the fluid in high velocity multiple streams into and at a tangent to a cylinder above the cone shaped housing in accordance with the present invention.
Figure 7:
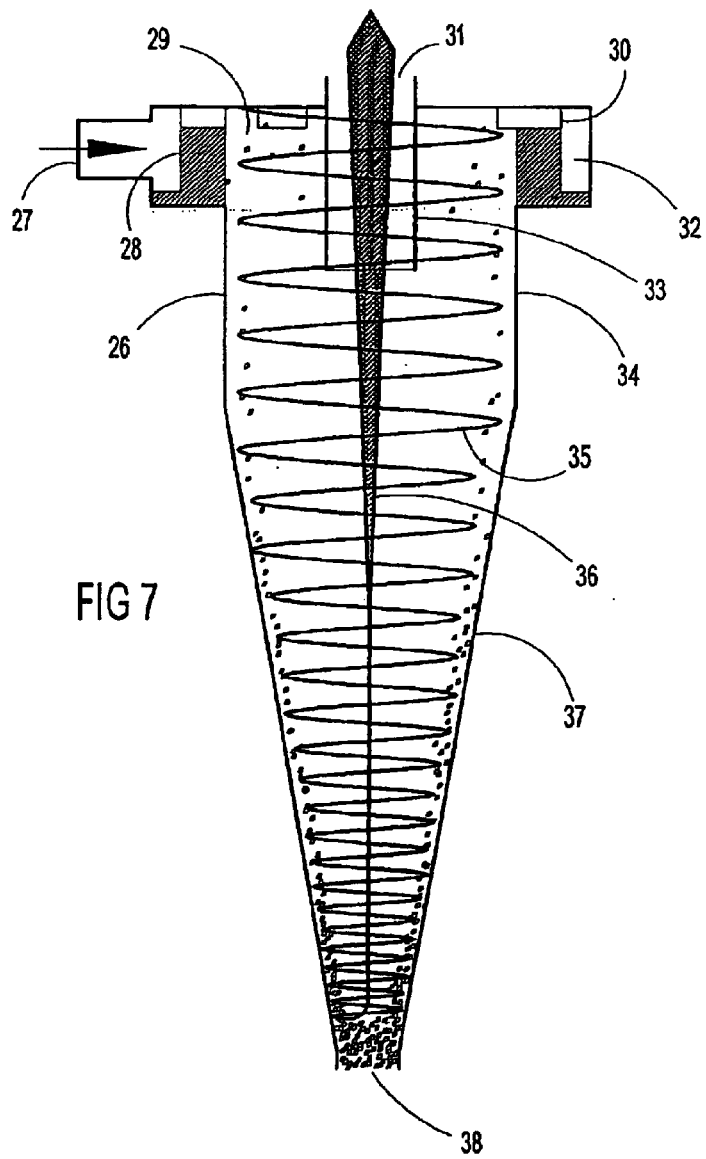

FIGS. 6 and 7 illustrate simplified horizontal and vertical schematics of another embodiment of a cyclone filter 26 in accordance with the present invention. The cyclone filter 26 consists of an inlet 27, a distribution channel 32, a spiral-grooved ring 28 with multiple spiral grooves 30, a cylinder 34 in which the fluid is made to circulate, a lower cone 37, and a cone outlet 38, sometimes referred to as an "orifice", for discharging the solid particles separated from the fluid. The spiral-grooved ring is positioned in the outside of the cylinder 34.

FIG. 6 illustrates the horizontal flow of fluid as it enters the cyclone filter 26. The arrows indicate the direction of fluid flow. Fluid enters the filter 26 through inlet 27 and flows into the distribution channel 32 then flows in both directions around the outside of spiral-grooved ring 28. The fluid from the distribution channel 32 is divided and flows into six spiral grooves 30 where its velocity is increased then injected as narrow streams into the outer diameter 29 and tangent to the circumference of cylinder 34. Six grooves 30 are shown, as the example in this illustration, but it is clearly understood that any number of grooves can be added based on the size of the cyclone filter without departing from the spirit of invention.

It is understood by those skilled in the art that water injected at multiple points in a narrow stream around and tangent to the circumference of the filter will cause less disturbance than a single, wide stream injected at a single point. Multiple streams allow a higher injection velocity. A conventional filter with a 2-inch, schedule-40 pipe inlet would have a cross-sectional area of approximately 3.36 square inches (3.36in$^2$). A 2-inch, schedule-80 pipe inlet would have a cross-sectional area of 2.95in$^2$. Water flowing at 100 gallons-per-minute (gpm) through the schedule 40 inlet would have a velocity of 9.56 feet-per-second (ft/sec), and through the schedule 80 inlet a velocity of 10.86 ft/sec.

With the present invention with an equivalent rectangular inlet area having dimensions of 1.295-inches in width and 2.59-inches in height causes less mixing of inlet and outlet fluids. Further, a spiral-grooved ring with six grooves of 0.5-inches in width and 1-inch in height provides a flow velocity of 10.694 ft/sec injected into the cylinder.

A spiral-grooved ring with eight grooves of 0.5-inches in width and 0.75-inches in height provides a flow velocity of 10.694 ft/sec also. A spiral-grooved ring with six grooves of 0.5-inches in width and 0.75-inches in height provides a flow velocity of 14.26 ft/sec, an even better improvement. A spiral-grooved ring with four grooves of 0.375-inches in width and 1.50-inches in height would also provide a flow velocity of 14.26 ft/sec.

The spiral-groove rings with multiple narrow streams as indicated above allows a larger outlet 31 without mixing the inlet and outlet fluids and with less pressure drop than conventional cyclone filters operating at the same flowrate.

Figure 8:
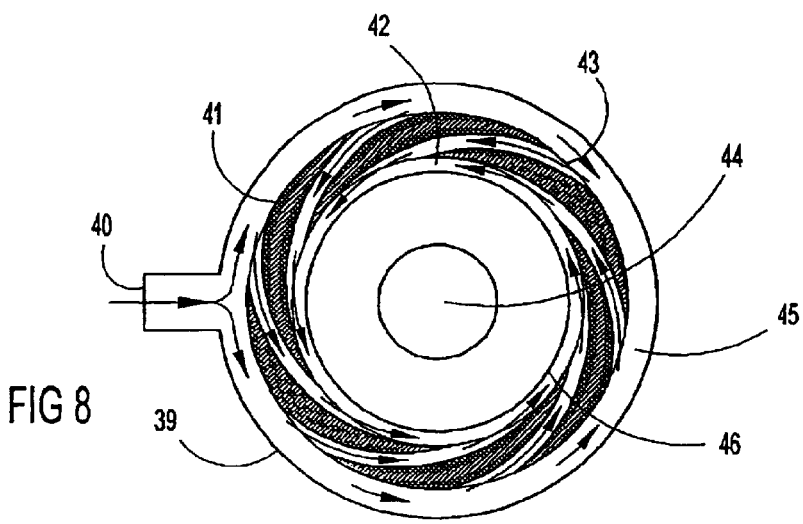
FIGS. 8 and 9 are fluid diagrams of another embodiment of a cyclone filter employing a spiral-grooved ring mounted outside the housing to divide the entering fluid and inject the fluid in high velocity multiple streams into an annulus in the outer diameter of a cylinder above the cone shaped housing in accordance with the present invention.
Figure 9:
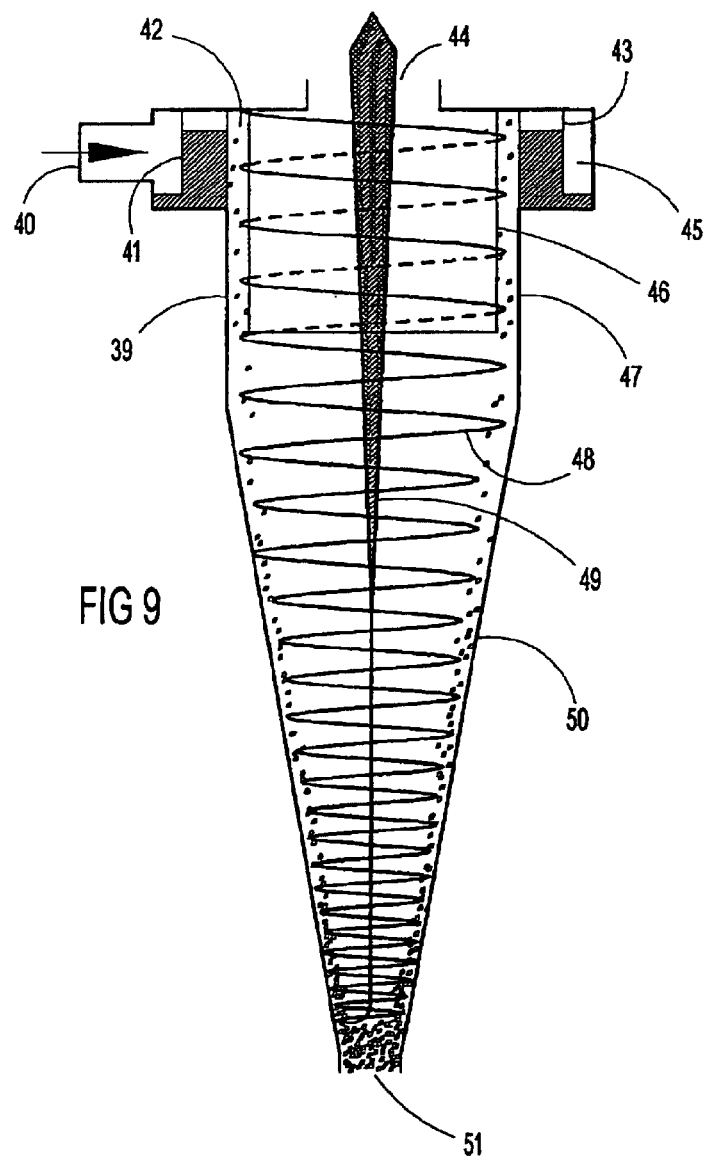

FIGS. 8 and 9 illustrate a simplified schematic of another embodiment of a cyclone filter 39 in accordance with the present invention. The cyclone filter 39 consists of an inlet 40, a distribution channel 45, a spiral-grooved ring 41 with multiple spiral grooves 43, a cylinder 47 serving as the outer diameter of a down-flow annulus 42, an inner short cylinder or skirt 46 serving as the inside diameter of the down-flow annulus 42, a lower cone 50, and a cone outlet 51 for discharging solid particles separated from the fluid, and a fluid outlet 44.

FIG. 8 illustrates the horizontal flow of the fluid as it enters the cyclone filter 39. The arrows indicate the direction of fluid flow. Fluid enters the cyclone filter 39 through the inlet 40 and flows into the distribution channel 45 in both directions around the outside of the spiral-grooved ring 41. The fluid from the distribution channel 45 is divided and flows into six spiral grooves 43 where its velocity is increased then injected into a narrow down-flow annulus 42. The down-flow annulus 42 allows the fluid to be injected at a velocity much higher than filters with no annulus 42 without interfering with the outgoing fluid. The fluid flows downward in a spiral motion 48. The circulating fluid causes a vortex 49 to form at the low-pressure center. As the fluid flows down the lower cone 50 it is forced to the center and upward through the outlet 44. With the inner skirt 46 dividing the incoming and outgoing fluids, the outlet 44 can be much larger without the need of a vortex finder. Solid particles separated from the fluids are discharged through the outlet 51 into a collection chamber (not shown) or other receptacle.

Figure 10:
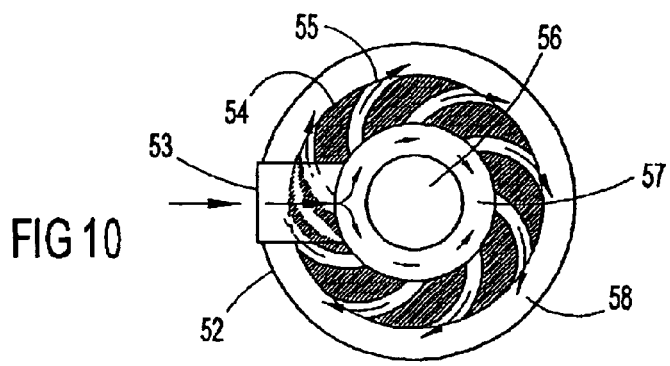
FIGS. 10 and 11 are fluid diagrams of another embodiment of a cyclone filter employing a spiral-grooved ring mounted inside the housing to divide the entering fluid and inject the fluid in high velocity multiple streams into an annulus in the outer diameter of a cylinder above the cone shaped housing in accordance with the present invention.
Figure 11:
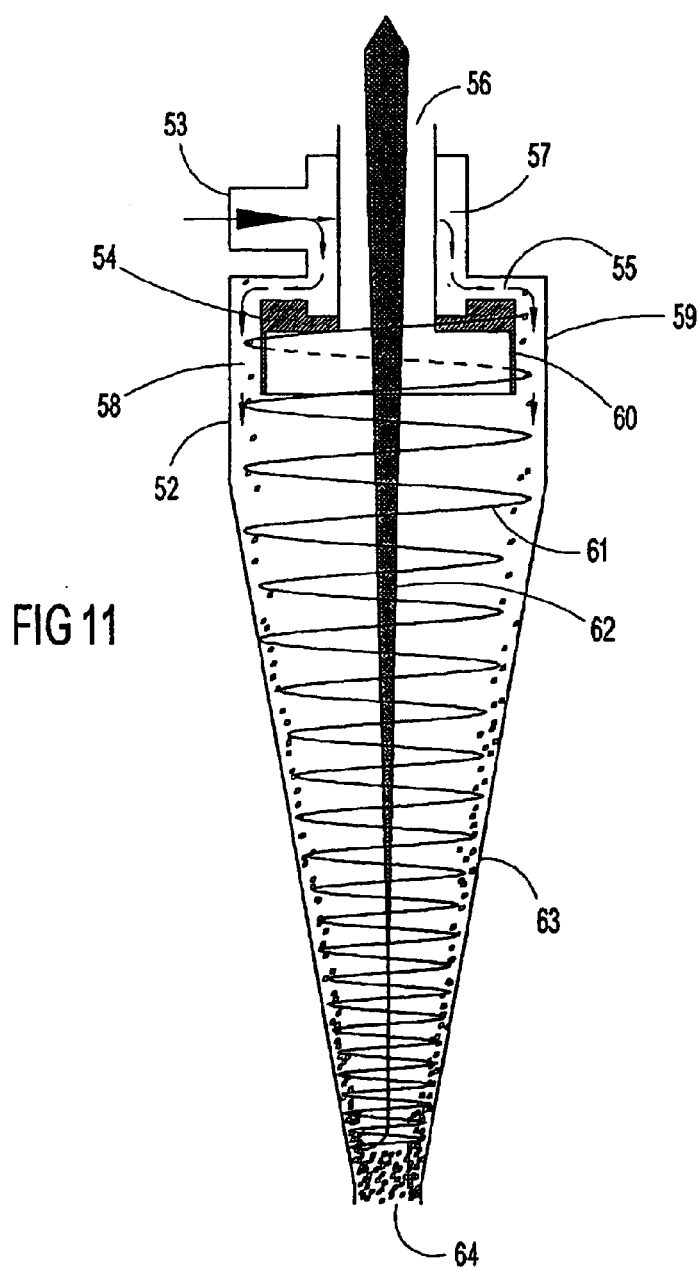

FIGS. 10 and 11 provide simplified schematics of another embodiment of a cyclone filter 52 in accordance with the present invention. The cyclone filter 52 consists of an inlet 53, a distribution channel 57, a spiral-grooved ring 54, a down flow annulus 58 between the outside and inner cylinders 59 and 60 respectively, a lower cone 63, and a cone outlet 64, and a fluid outlet 56. A collection chamber (not shown) can be added to the filter.

Fluid containing the suspended solids to be removed enters the filter through the inlet 53 and flows into the distribution channel 57 inside the spiral-grooved ring 54. The fluid flows through the multiple spiral grooves 55 and injected at a high circulating velocity into the down-flow annulus 58. The inner short cylinder or skirt 60 divides the inflow from the outflow to prevent the incoming fluid from mixing with the outflow and also prevent any solid particle from escaping before separation in the lower part of the filter. The multiple injection points provided by the spiral grooves 55 with the narrow accelerating annulus 58 divided from the outflow provides a higher tangential or horizontal circulating fluid velocity adjacent to the outer cylinder 59.

When the fluid emerges from the lower part of the down-flow annulus 58 it is at its maximum velocity in a very narrow integrated stream creating a maximum centrifugal force at the outer diameter of the filter with less disturbance than a wide single inlet entering and mixing with the large amount of water in the upper part of filters with large diameters ranging from 6 to 30 inches, or even larger. The higher tangential velocity without disturbing the outflow removes finer (smaller) particles that would normally require a second smaller filter to separate them. The fluid flows downward in a spiral motion 61. The circulating fluid causes a vortex 62 to form at the low-pressure center. As the fluid flows down the lower cone 63 it is forced to the center and upward through the outlet 56. With the inner skirt 60 dividing the incoming and outgoing fluids, the outlet 56 can be much larger without the need of a vortex finder. Solid particles separated from the fluids are discharged through the outlet 64 into a collection chamber (not shown) or other receptacle.

Figure 12:
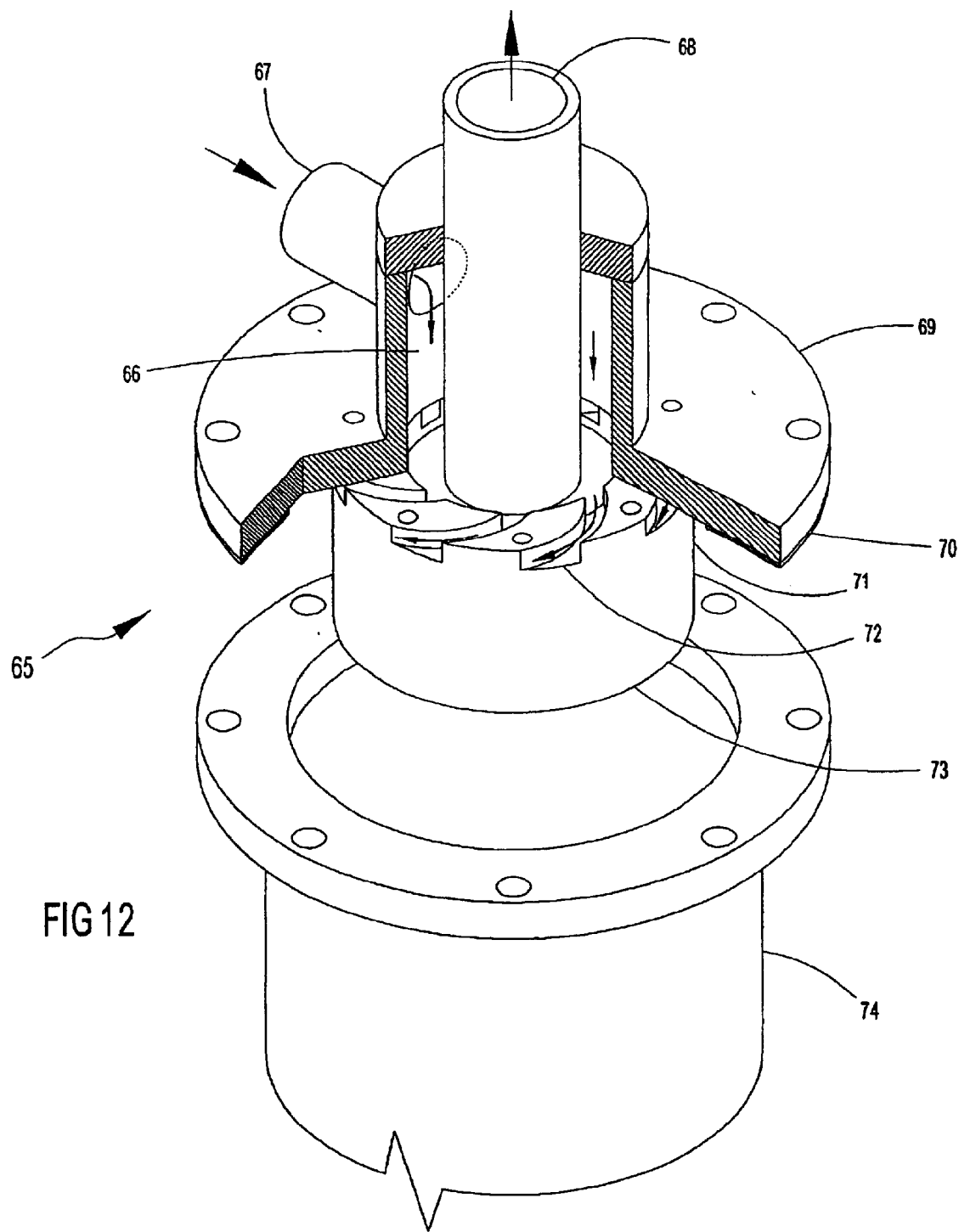
FIG. 12 is a three dimensional illustration of a typical spiral-grooved ring mounted inside the upper part of the cyclone filter housing in accordance with the present invention.

FIG. 12 provides a three dimensional illustration of an enlarged upper part of an embodiment of the cyclone filter 65 in accordance with the present invention. The cyclone filter 65 illustrated generally consists of an upper flange assembly 69, a gasket 70, a spiral-grooved ring assembly 71, and the top part of a lower housing 74. The spiral-grooved ring assembly 71 has a skirt 73 and an outlet 68 as part of the ring assembly 71. The arrows indicate the direction of fluid flow. The fluid flows into the inlet 67, down the distribution channel 66, into the multiple spiral grooves 72, and then injected at high velocity into the lower housing 74.

Figure 13:
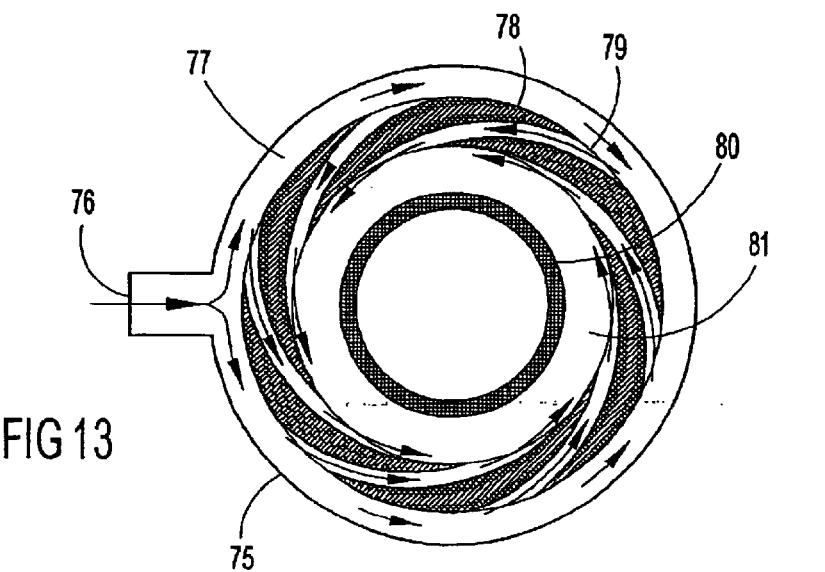
FIGS. 13 and 14 are fluid diagrams of another embodiment of a fluid mixer used as a dissolved gas generator employing the spiral-grooved ring mounted outside the housing and a diffuser mounted inside the housing for saturating liquids with dissolved gases in accordance with the present invention.
Figure 14:
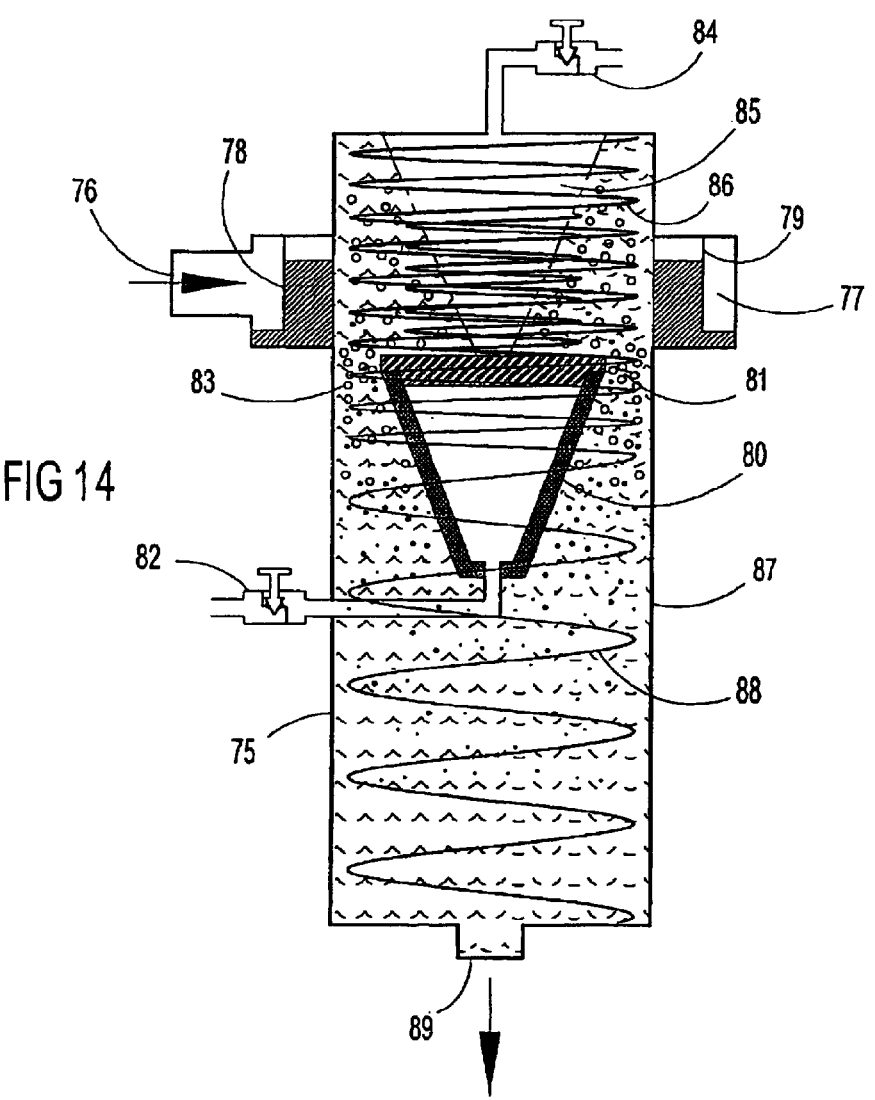

FIGS. 13 and 14 provides a fluid schematic of an embodiment of a fluid mixer 75 used as a dissolved gas generator employing the dynamic forces of flow obtained with the spiral-grooved ring in accordance with the present invention. The fluid mixer 75 consists of a fluid inlet 76 on a donut housing, a distribution channel 77, a spiral-grooved ring 78, a cylinder 87, a fluid outlet 89, a gas diffuser 80, an inlet gas-metering valve 82, and an outlet gas-metering valve 84.

The fluid enters the dissolved gas generator 75 through the inlet 76 and flows into the distribution channel 77 outside the spiral-grooved ring 78 and flows in both directions. The fluid flows through the spiral grooves 79 and is injected at a high circulating velocity into the upper part of the cylinder 87 above the diffuser 80. Gas enters the diffuser through the inlet gas-metering valve 82 and is distributed through the porous material of the diffuser into the pressurized circulating fluid where it is dissolved.

The circulating fluid 86 causes a vortex 85 to form in the top of the cylinder 87. The top of the diffuser serves as a vortex interceptor. Excess gas is released to the atmosphere through the outlet gas-metering valve 84. The fluid flows downward in a spiral motion through a mixing zone 81 where it encounters gas 83 bubbling upward. The downward spiraling fluid flows with a high enough velocity to carry the gas bubbles through the mixing zone 81.

The diffuser 80 may be an inverted cone. The cross sectional area of the cylinder 87 outside the diffuser 80 increases downward causing the fluid velocity to decrease as it passes the diffuser 80 cone. The decrease in fluid velocity allows the gas bubbles to flow upward and return to the mixing zone 81. The circulating gas bubbles ensures that the fluid becomes saturated with gas before exiting through the bottom outlet 89.

Figure 15:
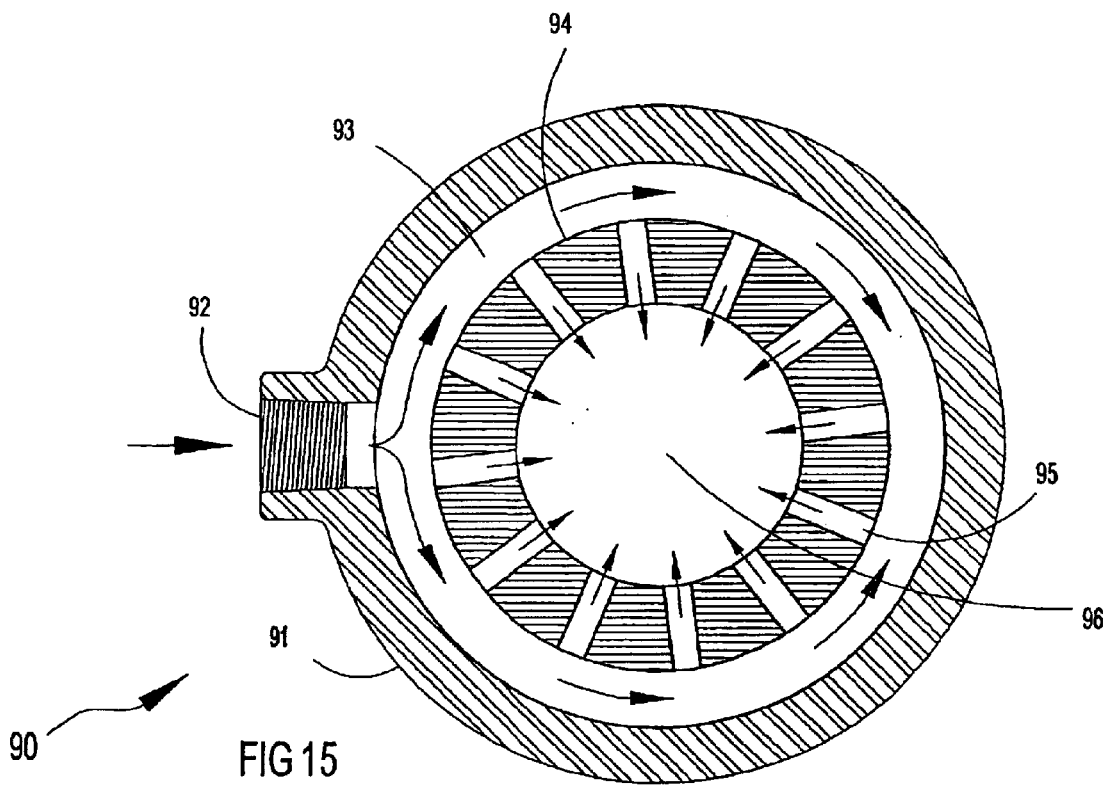
FIGS. 15–17 are fluid diagrams of another embodiment of a fluid mixer used as a dissolved gas generator employing a radial-grooved ring, an orifice ring positioned with the orifice ports over each groove in order to inject a gas into each stream, and an impact zone for saturating liquids with dissolved gases in accordance with the present invention.
Figure 16:
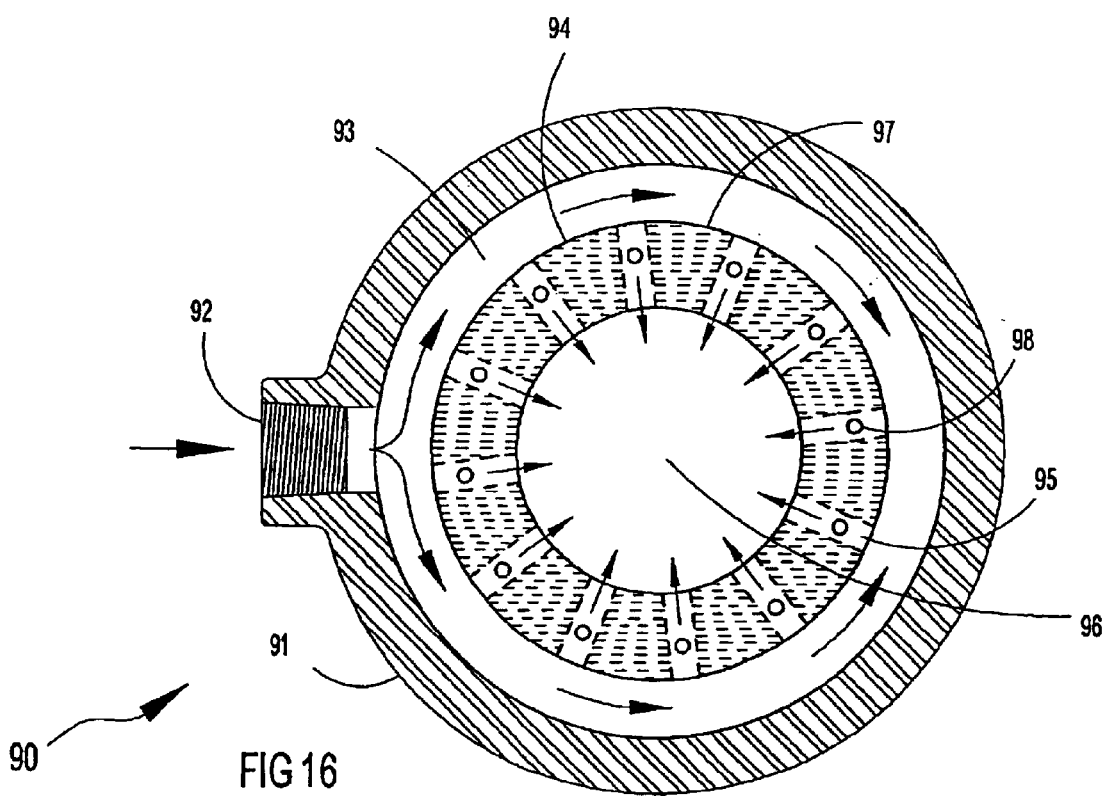
Figure 17:
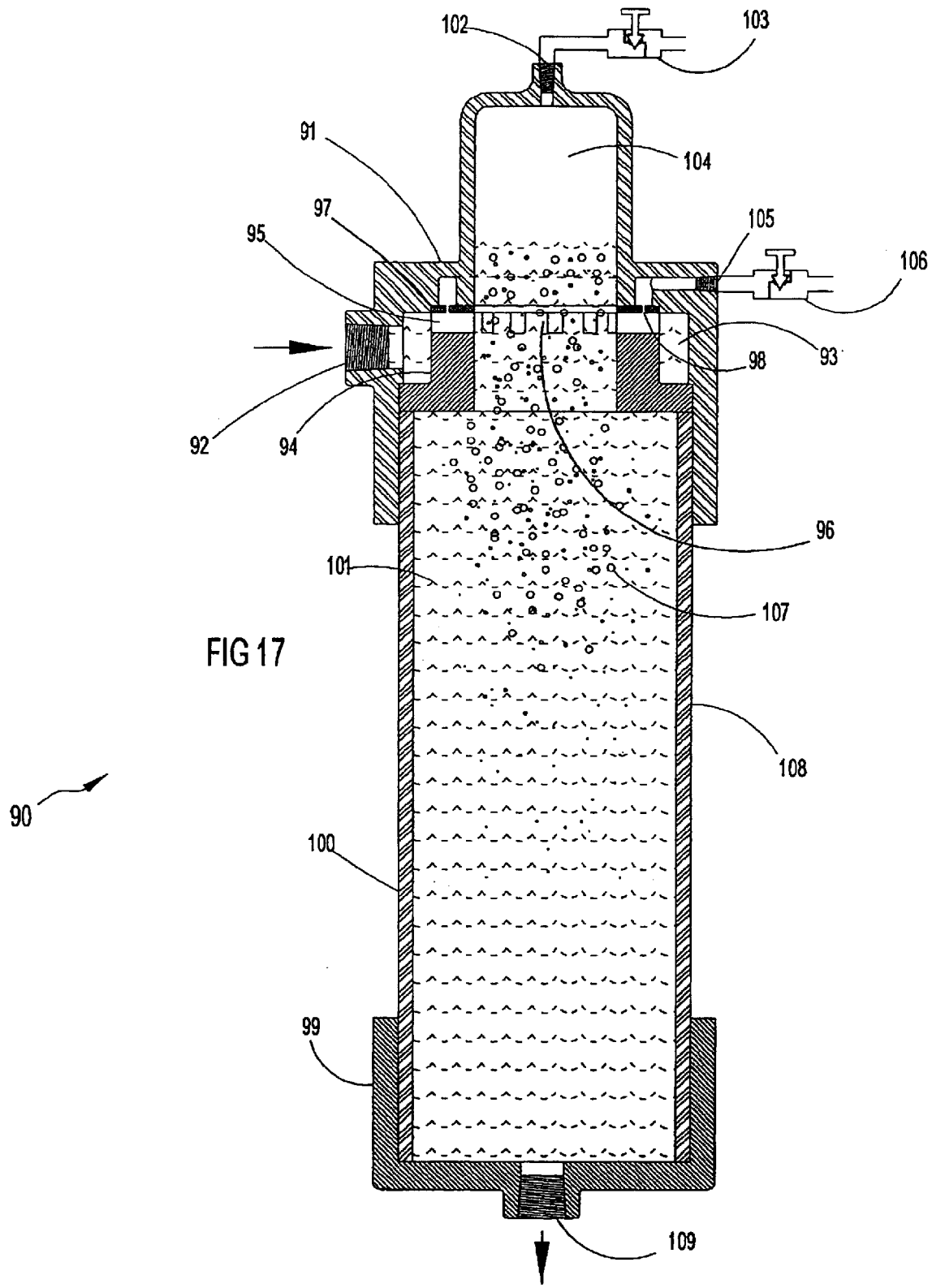

FIGS. 15–17 depict another embodiment of a fluid mixer 90 used as a dissolved gas generator employing the dynamic forces of fluid flow obtained with a radial-grooved ring in accordance with the present invention. FIG. 15 depicts a horizontal cross sectional view of the liquid inlet to the dissolved gas generator 90 illustrating the cylindrical donut housing 91, the distribution channel 93, the radial-grooved ring 94 with 16 radial grooves 95, and an impact chamber 96 to which the radial grooves 95 are directed.

FIG. 16 also provides a horizontal cross sectional view of the fluid mixer 90 with an orifice ring 97 positioned with the orifice-ports 98 over the radial grooves 95. The arrows indicate the direction of liquid flow. FIG. 17 provides a vertical cross sectional view of the fluid mixer 90 assembly consisting of an cylindrical donut housing 91, an orifice ring 97, a radial-grooved ring 94, a lower cylinder 108, and a lower cylinder cap 99. The cylindrical donut housing 91 has a gas separation chamber 104 to separate the excess gases from the liquids so the gases can be discharged while retaining the liquid.

The center of the radial-grooved ring 94 serves as an impact zone 96 into which the multiple streams of the liquid-gas mixture flowing at a high velocity are directed to collide with each other. An inlet gas-metering valve 106 connected to the gas inlet 105 of the cylindrical donut housing 91 regulates the amount of gas supplied during operation. An outlet gas-metering valve 103 connected to the gas outlet 102 of the cylindrical donut housing 91 regulates the amount of gas discharged from the device during operation.

Referring to FIG. 16, the arrows indicate direction of liquid flow. The liquid enters the fluid mixer 90 through the inlet 92 and flows into the distribution channel 93 in both directions around the radial grooved ring 94. The liquid is divided and flows into the radial grooves 95 under the orifice ring 97 where gas is injected into each of the high velocity streams. The liquid-air mixture in each groove is then injected into the impact zone 96.

Referring to FIG. 17, again the liquid enters through inlet 92 and flows into the distribution channel 93 around the radial-grooved ring 94. The liquid then flows through the radial grooves 95 where the gas is injected through the orifice 98 into each liquid stream. The liquid-gas mixture in each of the grooves 95 is then injected at high velocity into the impact zone 96 to collide with each other. The liquid becomes saturated with the gas at this point. The inlet gas-metering valve 106 regulates the amount of gas supplied.

The saturated liquid flows downward out of the impact zone 96 and into the larger area of the lower cylinder 108 where the velocity is decreased. The excess gas bubbles 107 flow upward and return to the impact zone 96. The saturated liquid continues to flow downward and exits through the outlet 109. The excess gas bubbles flow up through the impact zone 96, and the gas is separated from the liquid in the separation chamber 104 and released from the unit through the outlet gas-metering valve 103.

The amount of gas retained in the separation chamber 104 regulates the liquid level in the apparatus. The amount of gas released is adjusted to maintain the liquid level just above the impact zone 96, and only a small amount of gas has to be released from the chamber 104. The fluid mixer 90 is extremely effective at saturating liquid with gas with only five parts that can be manufactured in many sizes at low cost. It can be manufactured in metal or in plastic either machined or injected molded.

Figure 18:
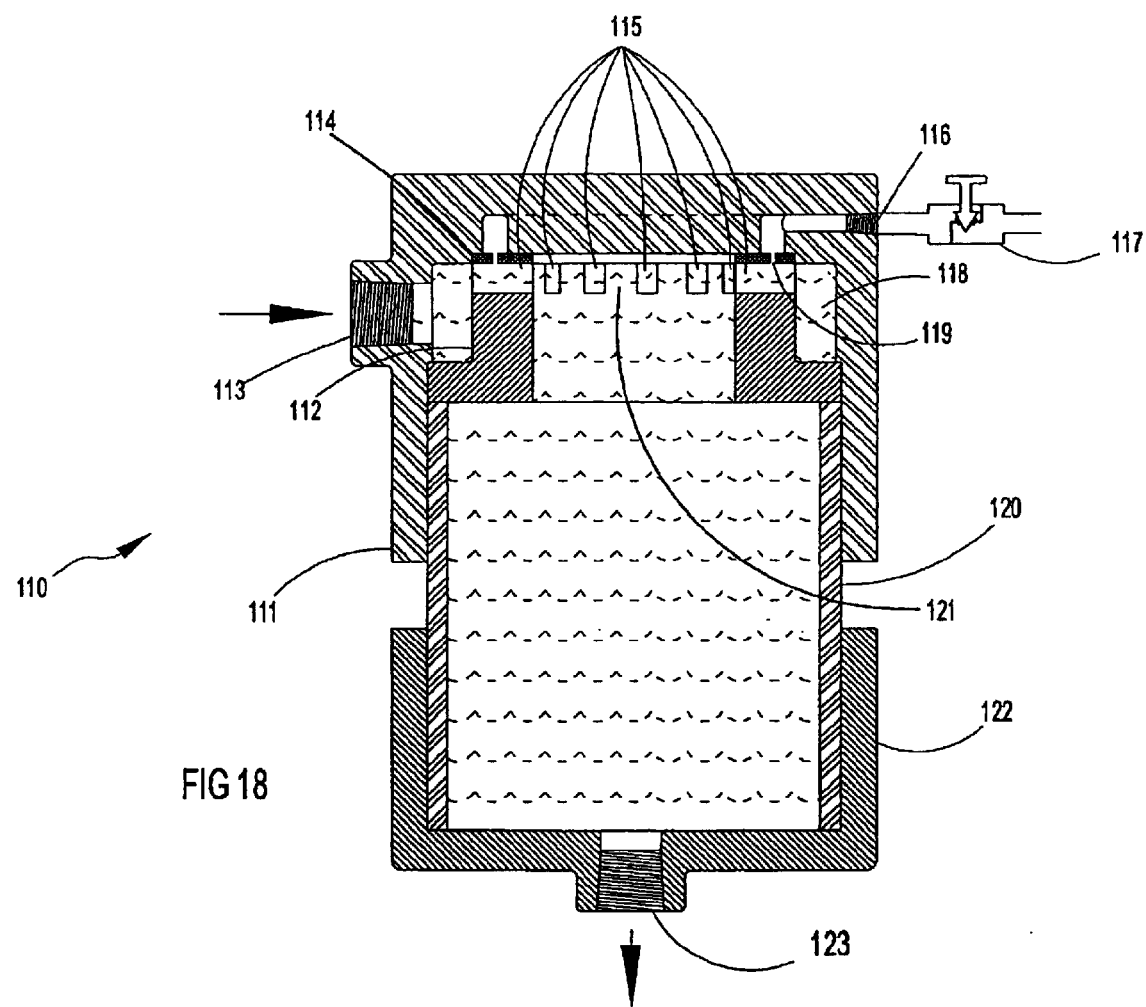
FIG. 18 is fluid diagrams of another embodiment of a fluid mixer employing a radial-grooved ring, an orifice ring positioned with the orifice ports over each groove in order to inject a second fluid into each stream, and an impact zone for mixing various fluids without provisions for releasing excess gases in accordance with the present invention.

FIG. 18 depicts another embodiment of a fluid mixer 110 for mixing liquids, for mixing gases, and for mixing gases and liquids where excess gases do not have to be separated from the liquids in accordance with the present invention. The fluid mixer 110 consists of an upper donut housing 111, an inlet 113, an orifice ring 114, a radial-grooved ring 112, a short lower cylinder 120, and a lower cylinder cap 122. The operation of the fluid mixer 110 is similar to the operation of the other fluid mixers previously discussed.

A first or primary fluid enters the dynamic mixer 110 through the inlet 113 and flows into the distribution channel 118 around the radial-grooved ring 112. The primary fluid then flows through the radial grooves 115 where a second fluid is injected into each stream through the orifices 119 into each primary fluid stream. The fluid mixture in each of the radial grooves 115 is then injected at high velocity into the impact zone 121 to collide with each other and become completely mixed. The fluid mixture flows downward out of the impact zone 121 into the short lower cylinder 120 and exits the fluid mixer 110 through the outlet 123. Valve 117 regulates the amount of secondary fluid into the mixer 110.

Figure 19:
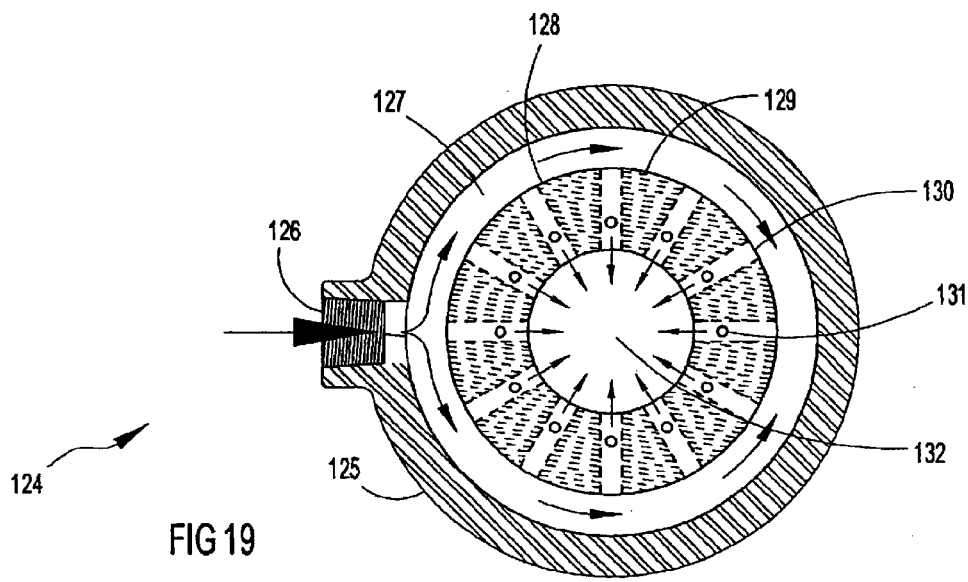
FIGS. 19–20 are fluid diagrams of another embodiment of a fluid mixer employing a radial-grooved ring, a combination venturi-orifice ring positioned with the venturi and orifice ports in each groove in order to draw a second fluid into each stream, and an impact zone for mixing the various fluids in accordance with the present invention.
Figure 20:
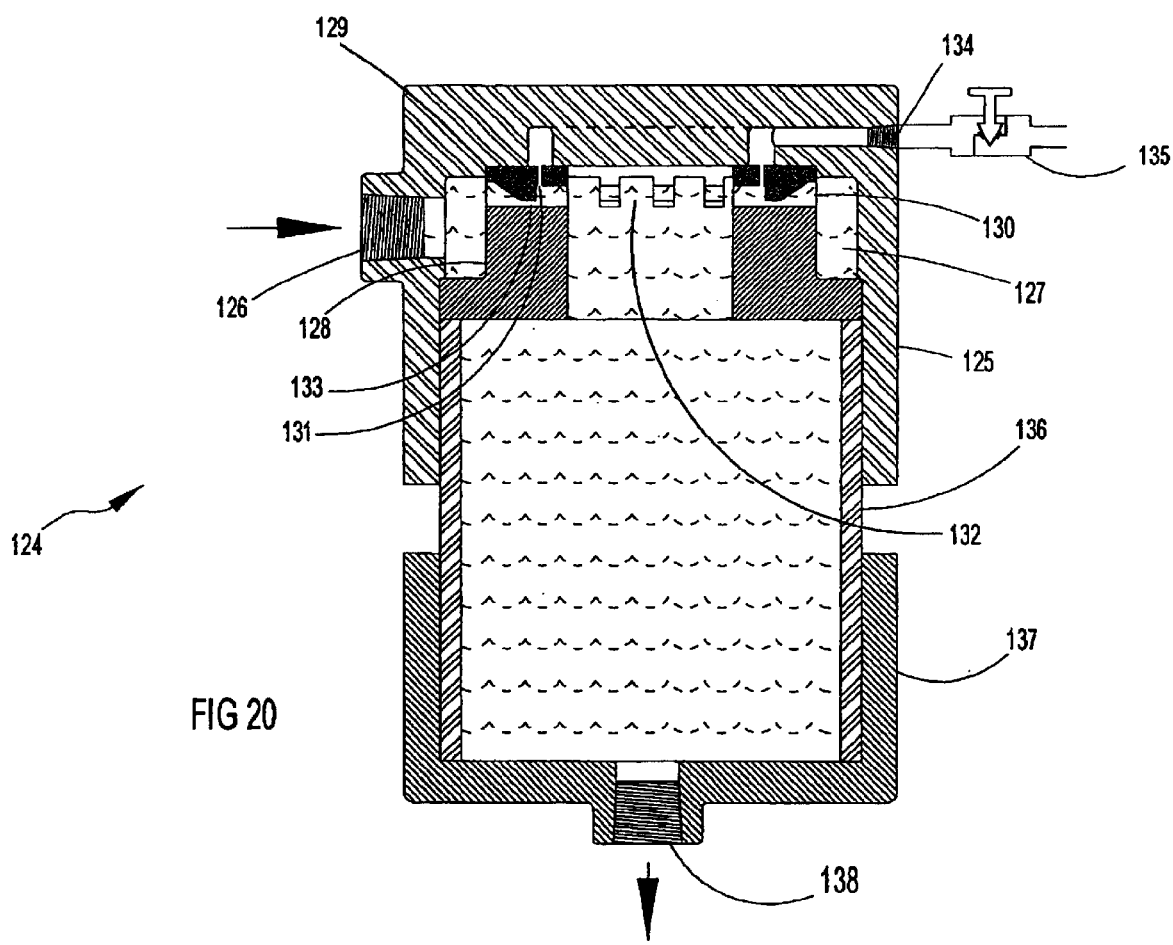

FIGS. 19 and 20 depict another embodiment of an fluid mixer 124 employing a radial-grooved ring 128, a combination venturi-orifice ring 129, and an impact zone 132 for mixing various fluids in accordance with the present invention. The fluid mixer 124 consists of an upper housing 125, a primary fluid inlet 126, a combination venturi-orifice ring 129, a radial-grooved ring 128, a secondary fluid inlet 134, a short lower cylinder 136, and a lower cylinder cap 137.

The operation of the dynamic mixer is similar to the operation of the other dynamic mixers previously discussed. A first or primary fluid enters the fluid mixer 124 through the inlet 126 and flows into the distribution channel 127 around the radial-grooved ring 128. The primary fluid then flows through the radial grooves 130 where a second fluid is drawn into each stream by the venturi 133 through the orifices 131 into each primary fluid stream. The fluid mixture in each of the radial grooves 130 is then injected at high velocity into the impact zone 132 to collide with each other and become completely mixed. The fluid mixture flows downward out of the impact zone 132 into the short lower cylinder 136 and exits the fluid mixer 124 through the outlet 138. Valve 135 regulates the amount of secondary fluid into the fluid mixer 124.

Figures 21A, 21B:
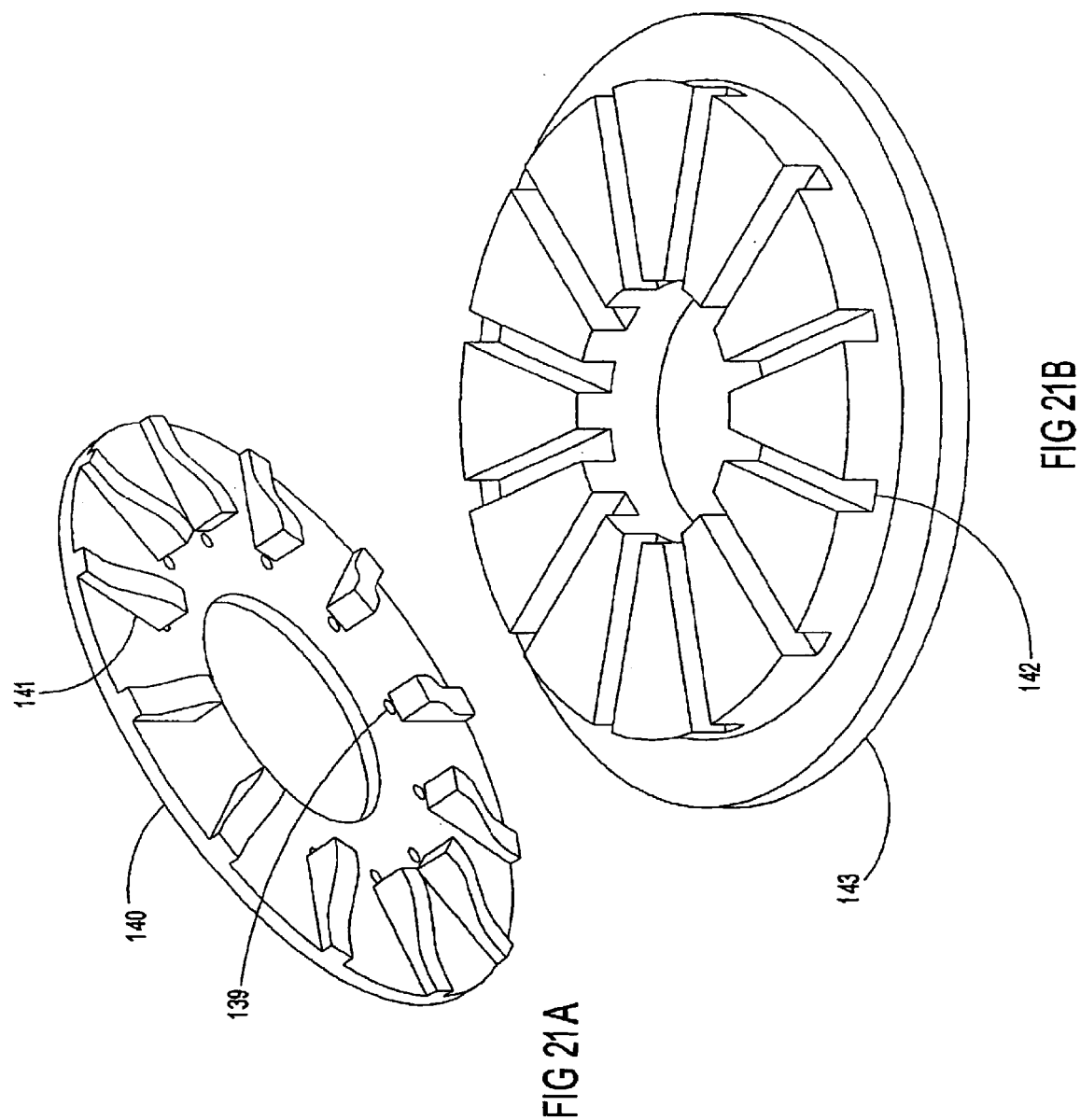
FIGS. 21A and 21B provide three-dimensional illustrations of a typical radial-grooved ring and a combination venturi-orifice ring used in the fluid mixer in accordance with the present invention.

FIG. 21 provides three-dimensional illustration of a typical radial-grooved ring 143 having 12 radial grooves 142 and a combination venturi-orifice ring 140 having 12 orifices 139 and 12 venturi 141 to fit onto the radial-grooved ring 143 of a fluid mixer.

Although various embodiments have been shown and described, the invention is not so limited and will be understood to include all such modifications and variations as would be apparent to one skilled in the art.

What is claimed is:

1. A method of mixing fluid to saturate liquids with gases comprising:

inserting fluid into a fluid mixer via a fluid inlet in a cylindrical donut housing;

flowing the fluid through a distribution channel in a ring having a plurality of grooves, the ring being concentric to the cylindrical donut housing, the ring having an outer diameter on a first end that is smaller than a diameter of the cylindrical donut housing thus defining the distribution channel;

forcing the fluid in a downwardly spiral in a cylinder by passing the fluid through the plurality of grooves and into the cylinder concentric with the ring and surrounded by the ring, the cylinder in fluid communication with the distribution channel via the grooves;

inserting gas into the cylinder via a gas inlet, the gas passing through a porous gas diffuser disposed within the cylinder, the diffuser having an impervious flat top;

dissolving gas exiting the porous diffusion into pressurized circulating fluid, the fluid flowing in a generally downward spiral direction, the gas bubbling upward;

mixing the downward spiraling fluid with the upwardly bubbling gas in a mixing zone in the cylinder; and removing a fluid saturated with gas at a fluid outlet located on a bottom surface of the cylinder.

2. The method of claim 1 further comprising providing the diffuser having an inverted cone shape.

3. A method of saturating fluids with gases comprising:

inserting fluid into a fluid mixer via a fluid inlet in an upper housing, the upper housing having a cylindrical donut with the fluid inlet;

flowing the fluid through a distribution channel in a ring having a plurality of grooves, the ring being concentric to the cylindrical donut housing, the ring having an outer diameter on a first end that is smaller than a diameter of the cylindrical donut housing thus defining the distribution channel;

forcing the fluid in a downward in a cylinder by passing the fluid through the grooves and into the cylinder concentric with the ring and surrounded by the ring, the cylinder in fluid communication with the distribution channel via the grooves;

injecting gas to the fluid leaving the grooves with an orifice ring in fluid communication with a gas inlet;

separating excess gases from liquids in a gas separation chamber in the upper housing;

discharging excess gases through a gas outlet on the upper housing; and removing saturated liquid from the cylinder via a saturated liquid outlet located at the bottom of the cylinder.

4. The method of claim 3 further comprising:

regulating the amount of gas entering gas inlet of the orifice plate; and regulating the amount of gas exiting the gas outlet.

5. A method of mixing fluids comprising:

inserting a first fluid into a fluid mixer via a first fluid inlet in an upper donut housing;

flowing the fluid through a distribution channel in a ring having a plurality of grooves, the ring being concentric to the upper donut housing, the ring having an outer diameter on a first end that is smaller than a diameter of the upper donut housing thus defining the distribution channel;

forcing the first fluid in a downwardly spiral in a cylinder by passing the fluid through the grooves and into the cylinder, the cylinder concentric with the ring and surrounded by the ring, the cylinder in fluid communication with the distribution channel via the grooves;

injecting a second fluid into the fluid leaving the grooves with an orifice ring in fluid communication with a second fluid inlet; and removing the mixed fluid from the cylinder via a mixed fluid outlet located at the bottom of the cylinder.

6. A method of mixing fluids comprising:

inserting a first fluid into a fluid mixer via a first fluid inlet in an upper donut housing;

flowing the first fluid through a distribution channel in a ring having a plurality of grooves, the ring being concentric to the upper donut housing, the ring having an outer diameter on a first end that is smaller than a diameter of the upper donut housing thus defining the distribution channel;

forcing the first fluid in a downwardly spiral in a cylinder by passing the fluid through the grooves and into the cylinder, the cylinder concentric with the ring and surrounded by the ring, the cylinder in fluid communication with the distribution channel via the grooves;

injecting a second fluid into the first fluid for mixing therewith; and removing the mixed fluid from the cylinder via a mixed fluid outlet located at the bottom of the cylinder.

7. The method of claim 6 wherein the second fluid is a gas, and further comprising:

inserting the gas into the cylinder via a gas inlet, the gas passing through a porous gas diffuser disposed within the cylinder, the diffuser having an impervious flat top, the dissolving gas exiting the porous diffuser into pressurized circulating fluid, the circulating fluid flowing in a generally downward spiral direction, the gas bubbling upward; and mixing the downward spiraling fluid with the upwardly bubbling gas in a mixing zone in the cylinder before removal of the mixture.

8. The method of claim 6 further comprising injection the second fluid into the first fluid leaving the grooves with an orifice ring in fluid communication with a second fluid inlet.

9. The method of claim 8 in which the second fluid is a gas.

10. The method of claim 9 further comprising:

separating excess gases from liquids in a gas separation chamber in the upper housing; and discharging excess gases through a gas outlet on the upper housing.

11. The method of claim 10 further comprising:

regulating the amount of gas entering the gas inlet of the orifice plate; and regulating the amount of gas exiting the gas outlet.

12. The method of claim 8 in which the second fluid is a liquid.

* * * * *